United States Patent
Medvedev

(10) Patent No.: US 10,152,603 B2
(45) Date of Patent: *Dec. 11, 2018

(54) SYSTEMS AND METHODS FOR DETECTING SENSITIVE INFORMATION LEAKAGE WHILE PRESERVING PRIVACY

(71) Applicant: Google LLC, Mountain View, CA (US)

(72) Inventor: Ivan Medvedev, Bellevue, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,764

(22) Filed: Oct. 31, 2017

(65) Prior Publication Data

US 2018/0068124 A1    Mar. 8, 2018

Related U.S. Application Data

(63) Continuation of application No. 15/004,586, filed on Jan. 22, 2016, now Pat. No. 9,830,463.

(51) Int. Cl.
*G06F 21/60* (2013.01)
*H04L 29/06* (2006.01)
(Continued)

(52) U.S. Cl.
CPC ............ *G06F 21/602* (2013.01); *G06F 21/60* (2013.01); *H04L 9/008* (2013.01); *H04L 9/0894* (2013.01);
(Continued)

(58) Field of Classification Search
CPC .......... G06F 21/602; H04L 9/30; H04L 63/02
See application file for complete search history.

(56) References Cited

U.S. PATENT DOCUMENTS 7,320,069 B1    1/2008    Sundharraj et al.
7,970,142 B2    6/2011    Vennelakanti et al.
(Continued)

OTHER PUBLICATIONS

Shu et al., "Privacy-Preserving Detection of Sensitive Data Exposure", IEEE, Retrieved From https://ieeexplore.ieee.org/document/7038200/. Published Feb. 10, 2015 (Year: 2015).*
(Continued)

*Primary Examiner* — Chau Le
(74) *Attorney, Agent, or Firm* — Honigman Miller Schwartz and Cohn LLP

(57) ABSTRACT

Systems and methods for privacy-preserving data loss detection include performing a sweep of online information for a candidate data leakage to generate an online data set; performing an analysis of the online data set to determine that the online information is a candidate data leakage; the host encrypting the data communication and providing the host-encrypted data communication to a software agent at the enterprise; in response to receiving the host-encrypted data communication, the software agent encrypting a database of enterprise information and re-encrypting the host-encrypted data communication, and providing the same to the host; the host decrypting a host-encrypted aspect of the re-encrypted data communication to generate a software agent-encrypted data communication; determining whether a match exists between the encrypted database of information and the software agent-encrypted data communication; and based on whether the match exists, the software agent taking a first action or the host taking a second action.

20 Claims, 8 Drawing Sheets

(51) Int. Cl.
*H04L 9/30* (2006.01)
*H04L 9/00* (2006.01)
*H04W 12/02* (2009.01)
*H04L 9/08* (2006.01)
*H04L 29/08* (2006.01)

(52) U.S. Cl.
CPC ............... *H04L 9/30* (2013.01); *H04L 63/02* (2013.01); *H04L 63/0428* (2013.01); *H04W 12/02* (2013.01); *H04L 67/02* (2013.01); *H04L 2209/08* (2013.01)

(56) References Cited

U.S. PATENT DOCUMENTS

| | | | |
|---|---|---|---|
| 7,996,374 | B1 | 8/2011 | Jones et al. |
| 8,055,894 | B2 * | 11/2011 | Baker ................. H04N 7/1675 380/200 |
| 8,065,739 | B1 | 11/2011 | Bruening et al. |
| 8,416,709 | B1 | 4/2013 | Marshall et al. |
| 8,468,244 | B2 | 6/2013 | Redlich et al. |
| 8,555,383 | B1 | 10/2013 | Marshall et al. |
| 8,565,108 | B1 | 10/2013 | Marshall et al. |
| 8,572,758 | B1 | 10/2013 | Clifford |
| 8,595,481 | B1 * | 11/2013 | Gentry, Jr. ............ H04W 12/06 713/153 |
| 8,800,024 | B2 | 8/2014 | Cooper et al. |
| 8,826,443 | B1 | 9/2014 | Raman et al. |
| 8,868,927 | B1 * | 10/2014 | Lee ........................ G06F 21/83 713/189 |
| 8,977,857 | B1 * | 3/2015 | Triscon ................. H04L 9/3213 713/171 |
| 9,077,703 | B1 | 7/2015 | Goshen et al. |
| 9,177,174 | B1 | 11/2015 | Shoemaker et al. |
| 9,503,432 | B2 | 11/2016 | El Emam et al. |
| 2007/0240224 | A1 * | 10/2007 | Agrawal ........... G06F 17/30445 726/25 |
| 2008/0137840 | A1 | 6/2008 | Vanden Berghe et al. |
| 2009/0158430 | A1 | 6/2009 | Borders |
| 2009/0327943 | A1 * | 12/2009 | Medvedev ............. G06F 21/577 715/772 |
| 2009/0327971 | A1 | 12/2009 | Shostack et al. |
| 2012/0110174 | A1 * | 5/2012 | Wootton ............... G06F 21/564 709/224 |
| 2012/0210434 | A1 | 8/2012 | Curtis et al. |
| 2013/0246334 | A1 | 9/2013 | Ahuja et al. |
| 2013/0268757 | A1 * | 10/2013 | Kulkarni ................. G06F 21/33 713/168 |
| 2014/0229732 | A1 * | 8/2014 | Roth ..................... G06F 21/602 713/167 |
| 2015/0149763 | A1 * | 5/2015 | Kamara .................. H04L 9/083 713/150 |
| 2015/0163206 | A1 | 6/2015 | McCarthy et al. |
| 2015/0261940 | A1 | 9/2015 | Roundy et al. |
| 2015/0278549 | A1 | 10/2015 | Kolesnikov et al. |
| 2017/0048245 | A1 | 2/2017 | Owen et al. |

OTHER PUBLICATIONS

International Search Report and Written Opinion for PCT App No. PCT/US2016/067847 dated Mar. 28, 2017, 15 pgs.
Symantec Data Loss Prevention for Endpoint, Symantec, 2011, 3 pgs.
Data Loss Prevention, R77 Versions, Administration Guide, Check Point Software Technologies Ltd., May 5, 2015, 183 pgs.
Kanagasingham, P., Data Loss Prevention, Sans Institute InfoSec Reading Room, Aug. 15, 2008, 38 pgs.
McAfee Data Loss Prevetions 9.2 Software, Product Guide, McAfee, 2011, 138 pgs.
Understanding and Selecting a Data Loss Prevention Solution, Sans Institute, Securosis, L.L.C., [retrieved on Jul. 20, 2015], 26 pgs.
Sahay, S., Evolving Data Loss Prevention in SharePoint Online/ OneDrive for Business and Office Applications, Office Blogs, Jul. 19, 2015, 7 pgs.
Data Loss Prevention for OEMs, Sophos, 2013, 2 pgs.

* cited by examiner

SYSTEMS AND METHODS FOR DETECTING SENSITIVE INFORMATION LEAKAGE WHILE PRESERVING PRIVACY

CROSS-REFERENCE TO RELATED APPLICATIONS

This application is a Continuation Application of U.S. application Ser. No. 15/004,586, filed Jan. 22, 2016, the contents of which are incorporated herein by reference.

BACKGROUND

The subject matter discussed herein relates generally to methods and systems of detecting leakage of sensitive information while also preserving privacy, and more particularly, to a protocol between an external host and an enterprise to detect large-scale data leakage in a manner that protects private information.

RELATED ART

In the related art, online information breach associated with sensitive user data is occurring with growing scale and cost. For example, enterprises that are online entities, such as retailers, insurers and government agencies, may experience large-scale loss (or leakage) of sensitive information associated with individual users. For example, a third party may steal (e.g., hack) a credit card number, social security number, or account information, publicly display the sensitive information, or attempt to sell the sensitive information in an unauthorized manner.

The breaches associated with sensitive data leakage are large (e.g., millions of online user accounts) in scale and occur rapidly, and can cause losses to the online entity (e.g., enterprise) as well as the individual user. Further, it may be difficult or impossible for the enterprise itself to detect the leakage. Even if the leakage is detected, there can be a significant time delay between the leakage event and the detection of the leakage event.

To address the foregoing problem, related art approaches may be employed. For example, the entity (e.g., enterprise such as an online retailer or agency, but not limited thereto) may contact a host and provide the host with an indication of online data loss. For example, but not by way of limitation, the enterprise may indicate to the host that it believes that credit card numbers may have been leaked from the client, and would like the host to determine whether a leak has occurred.

In response to the request, the related art host may be able to search for the credit card numbers online, but cannot do so in a privacy-preserving manner. Further, as explained above, there is a time gap between the breach and the enterprise becoming aware of the breach. Additionally, some online enterprises are not able to detect the breach using their own monitoring tools.

Accordingly, a need exists for the enterprise to be able to have a host quickly make the determination as to whether there has been a data loss (e.g., large-scale), without provide the host without the actual sensitive information, with the host not knowing the source of the data loss, so as to preserve privacy.

SUMMARY

The subject matter includes computer-implemented methods for detecting data leakage, including a computer-implemented method of detecting data leakage, the method comprising performing, by a host external to a firewall of an enterprise, a sweep of online information for a candidate data leakage to generate an online data set; the host performing an analysis of the online data set to determine that the online information is a candidate data leakage, based on a context of the online data; the host encrypting the data communication and providing the host-encrypted data communication to a software agent at the enterprise; in response to receiving the host-encrypted data communication, and by using a common encryption key, the software agent encrypting a database of enterprise information and re-encrypting the host-encrypted data communication; providing the software agent-encrypted database of enterprise communication and the re-encrypted data communication to the host; the host decrypting a host-encrypted aspect of the re-encrypted data communication to generate a software agent-encrypted data communication; performing a matching operation to determine whether a match exists between the encrypted database of information and the software agent-encrypted data communication; for the match determined to exist, the host reporting the match to the software agent, and the software agent taking a first action; and for the match determined to not exist, the host taking a second action.

The subject matter also includes the software agent at the enterprise not being provided with a key used by the host encrypting the data communication originating from the online account, and the host not being provided with the common encryption key of the software agent.

According to the subject matter, the performing the matching operation comprises applying a privacy preserving set intersection algorithm. Further, the host partially encrypts the data communication, and leaves an unencrypted portion of the data communication as cleartext, and provides the partially encrypted data communication and the cleartext to the software agent.

Additionally, according to the subject matter, the software agent adds noise into the encrypted database and sends the encrypted database with the noise to the host. Also, the sweep of online information is a web sweep of the Internet, and the web sweep of the Internet is at a prescribed period.

Further, the subject matter includes the software agent re-ordering values in the host-encrypted data communication during the re-encryption of the host-encrypted data communication. Additionally, the host reporting the match to the software agent comprises the host providing the software agent with at least one of a number of matches, the encrypted matching candidate leaked information, and information associated with a source of the candidate data leakage.

The subject matter further includes the information being associated with a source of the candidate data leakage comprises at least one of a Uniform Resource Locator (URL) identified during the web sweep as the source of the candidate data leakage, and metadata associated with the URL.

The subject matter is also directed to a computer-implemented method of detecting data leakage at a host external to a firewall of an enterprise, the method comprising performing, by a host external to a firewall of an enterprise, a sweep of online information for a candidate data leakage to generate an online data set; the host performing an analysis of the online data set to determine that the online information is a candidate data leakage, based on a context of the online data; encrypting the data communication, and providing the host-encrypted data communication to a software agent at the enterprise; receiving a software agent-encrypted database of enterprise communication and the host-encrypted data communication, re-encrypted by the software agent; decrypting a host-encrypted aspect of the re-encrypted data communication to generate a software agent-encrypted data communication; performing a matching operation to determine whether a match exists between the encrypted database of information and the software agent-encrypted data communication; for the match determined to exist, reporting the match to the software agent; and for the match determined to not exist, the host taking an action.

According to the subject matter, the performing the matching operation comprises applying a privacy preserving set intersection algorithm.

Further, according to the subject matter, the host reporting the match to the software agent comprises the host providing the software agent with at least one of a number of matches, the encrypted matching candidate leaked information, and information associated with a source of the candidate data leakage.

Additionally, the subject matter includes the sweep of online information that is a web sweep of the Internet, and the web sweep of the Internet that is at a prescribed period.

A computer-implemented method of detecting data leakage from an enterprise having a software agent, the method comprising:

receiving, from a host external to a firewall of the enterprise, a host-encrypted data communication that originated from an online source associated with a candidate data leakage;

using a common encryption key, encrypting a database of enterprise information and re-encrypting the host-encrypted data communication;

providing the encrypted database of enterprise communication and the re-encrypted data communication to the host;

receiving a report from the host indicative of a match existing between the encrypted database of information and the re-encrypted data communication; and taking a first action.

According to the subject matter, the software agent at the enterprise is not provided with a key used by the host encrypting the data communication originating from the online account, and the host is not provided with the common encryption key of the software agent.

The subject matter also includes the software agent adding noise into the encrypted database and sending the encrypted database with the noise to the host.

Further, the subject matter includes the software agent re-ordering values in the host-encrypted data communication during the re-encryption of the host-encrypted data communication.

According to the subject matter, the first action by the software agent comprises providing an alert to an authority that the data leakage is associated with the enterprise.

The subject matter also includes a system for detecting data leakage at a host external to a firewall of an enterprise, including the host external to the firewall of the enterprise including a hardware processor and having executable instructions stored on a computer-readable medium, the instructions at the host comprising, performing, by a host external to a firewall of an enterprise, a sweep of online information for a candidate data leakage to generate an online data set; the host performing an analysis of the online data set to determine that the online information is a candidate data leakage, based on a context of the online data; encrypting the data communication, and providing the host-encrypted data communication to a software agent at the enterprise; receiving a software agent-encrypted database of enterprise communication and the host-encrypted data communication, re-encrypted by the software agent; decrypting a host-encrypted aspect of the re-encrypted data communication to generate a software agent-encrypted data communication; performing a matching operation to determine whether a match exists between the encrypted database of information and the software agent-encrypted data communication; for the match determined to exist, reporting the match to the software agent; and for the match determined to not exist, the software agent taking a first action; and the enterprise including a hardware processor and having executable instructions stored on a computer-readable medium receiving, from the host external to a firewall of the enterprise, the host-encrypted data communication; using a common encryption key, encrypting a database of enterprise information and re-encrypting the host-encrypted data communication, and providing the software agent-encrypted database and the re-encrypted data communication to the host; receiving a report from the host indicative of the match existing between the encrypted database of information and the software agent-encrypted data communication; and taking a second action.

Further, according to the subject matter, the software agent at the enterprise is not provided with a key used by the host encrypting the data communication originating from the online account, and the host is not provided with the common encryption key of the software agent.

DETAILED DESCRIPTION

Figure 1:
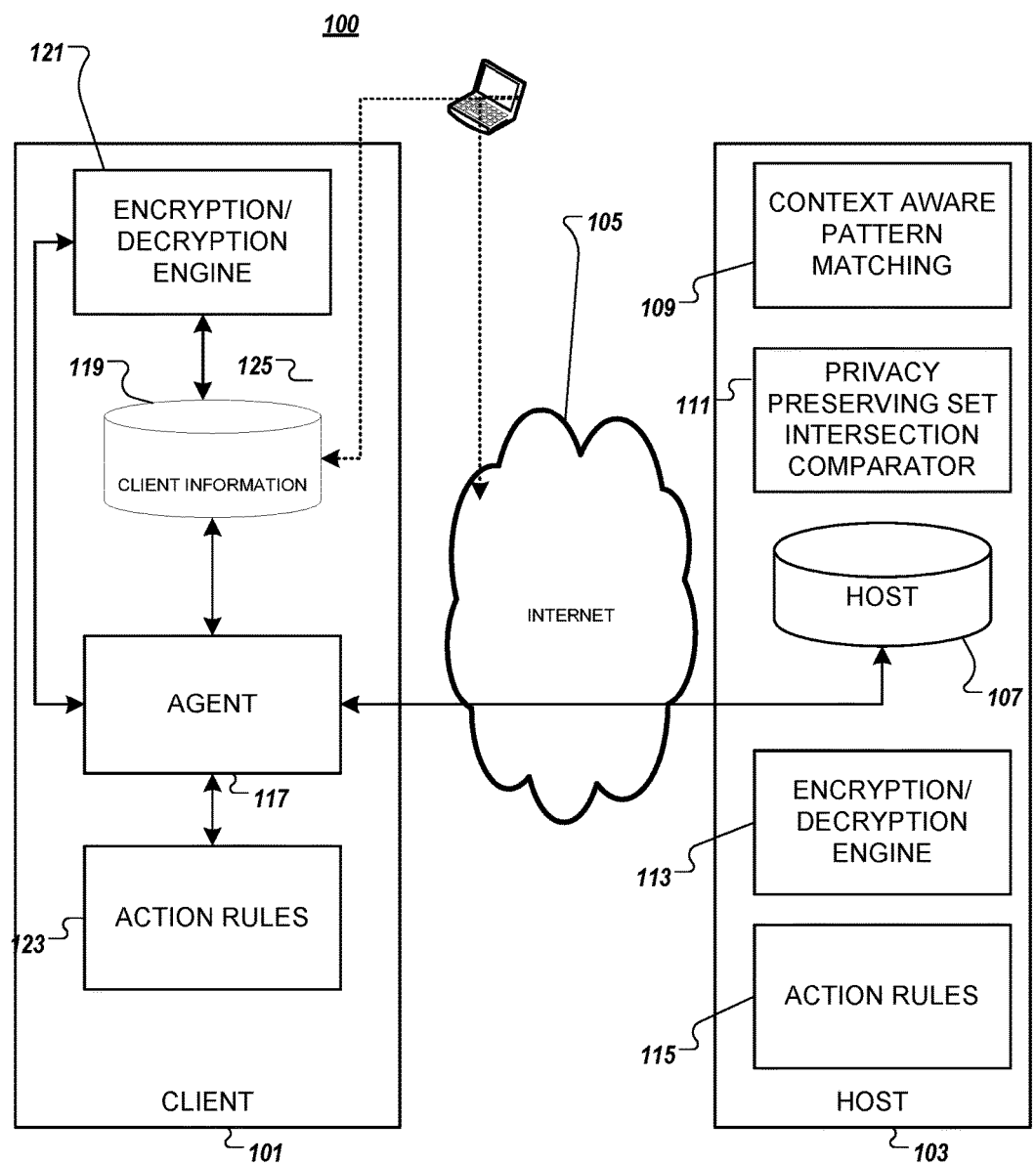
FIG. 1 shows a system with a client and a host having a protocol according to an example implementation.

The subject matter described herein is taught by way of example implementations. Various details have been omitted for the sake of clarity and to avoid obscuring the subject matter. The examples shown below are directed to structures and functions for implementing systems and methods for data loss detection while preserving privacy.

Aspects of the example implementations are directed to allowing a client (e.g., enterprise, such as a retailer or government agency) to determine whether sensitive information associated with users of the client has been leaked (e.g., stolen). For example, the data leak may be a large-scale data leak (e.g., millions of accounts). The determination is made by a host, without the client revealing the sensitive information to the host, and without the host providing any potentially sensitive information resulting from the determination process to be provided to the client.

For example, but not by way of limitation, the example implementation may include a client that is an online entity such as an enterprise with users that have provided sensitive information to the enterprise. For example, the enterprise may be an online retailer, and the user may be a customer that makes purchases from the website of the online retailer using electronic payment, such as by credit card, debit card, mobile device payment system, or other manner of payment as would be understood by those skilled in the art. Alternatively, the enterprise may an agency (e.g., tax, motor vehicles, health care), and the user may be individuals that have online transactions with that agency that include sensitive information (e.g., social security number, driver's license information, insurance account numbers, medical conditions). The client may be a user of online hosting services provided by the host (e.g., cloud computing or online application platform), or the client may not be a user of the online hosting services at all.

In the example implementation, the host includes an engine that performs an online search for the sensitive information of the client in the data (e.g., documents) associated with the host. The data associated with the host may be internal (e.g., stored in a cloud-based service and associated with the client) or external (e.g., online and publicly available on the Internet). For example, a web sweep of available online data, without limitation to the location being associated with the client or the host, may be performed to perform context aware pattern matching to detect potentially sensitive information at a location on the Internet (e.g., URL) indicative of a data leakage event. In the example implementation, the identity of the party responsible for the data leak (e.g., bad actor such as a hacker) may not be known, and information on potentially responsible parties may also not be available.

Further, the client includes an agent that may run in the secure environment of the client (including a secure online environment of the host). The agent is operative to facilitate a secure set intersection protocol, as explained in further detail below. Similarly, the host also includes a component that facilitates the secure set intersection protocol. A user interface (UI) is also provided, to allow the client to provide information (e.g., settings for sensitive information to be protected), and to provide results of the determination to the user (e.g., data leak or data theft information).

Additional aspects of the example implementations relate to systems and methods for detecting and/or preventing data leakage, loss or oversharing, including classic pattern matching and context aware sensitive information detection with assistance from the party under protection. The systems and methods are performed in an automatic, privacy preserving manner. For example, but not by way of limitation, the example systems and methods may employ cryptography, including but not limited to, privacy preserving set intersection algorithms. More specifically, a privacy preserving set intersection algorithm may be an algorithm or a method that allows for the determination of an intersection of two (or more) sets of data belonging to different parties, without either party gaining knowledge of the other party's full data set.

In the related art, a first Company A would like to provide a data leakage detection service (e.g., identifying loss of sensitive data such as but not limited to corporate credit card numbers associated with company B). Company A may be able to detect information on the Internet that looks like the sensitive information associated with Company B (e.g., users or account holders for Company B). However, the information that is available on the Internet also includes information that is not the sensitive information (e.g., noise).

The unauthorized leak of information such as credit card numbers and/or social security numbers as determined by Company A may, if provided to Company B, expose personal, sensitive information to company B. While Company B could address the foregoing issue by providing Company A with the database of corporate credit card numbers to detect, such an action would expose the private sensitive information of Company B to Company A.

According to the example implementations, a privacy preserving set intersection protocol is employed. In the foregoing example, Company A only shares encrypted results with company B (e.g., without sharing the key), and Company B only shares encrypted corporate card numbers with Company A without sharing its key. Depending on the implementation of the privacy preserving set intersection protocol, the result is the number of elements present in both sets, the list of exact elements present in both sets, and/or information associated with the source of the elements (e.g., uniform resource locator (URL) of a third party website where Company A found the information in the search process, with the third party website being the source of the stolen sensitive information that is displayed or sold online).

Thus, the sets themselves are not revealed to either party. As a result, the privacy of individual users and Company A is preserved, as the actual information associated with the web sweep and pattern matching for the findings is not reported to company B, and the privacy of Company B is also preserved, as the corporate card database is not shared with Company A.

An example use case that implements the above-explained naive protocol as provided as follows. While the specific data and context are provided herein for illustrative purposes, the present example implementations are not limited thereto, and other data and/or contexts may be substituted therefor without departing from the inventive scope. Further, while credit card numbers are used for explanatory purposes, the example implementations are not limited thereto, and other sensitive data for which the privacy should be protected may be substituted therefor, including, but not limited, account identifiers, government-issued accounts (e.g., driver's license or social security number information), or other sensitive information, as would understood by those skilled in the art.

In a first operation, Company A (e.g., the host) performs an analysis of the Internet, searching of numbers that appear to be the sensitive data. For example, Company A may perform a search of the Internet for all credit card-like numbers or social security-like numbers.

As a result of the analysis, two candidate credit card numbers are identified from a third-party website, 1111 and 2112. This circumstance may be due to the third party accessing the online information in an unauthorized manner, or of an individual with access to the sensitive information providing the sensitive data to the third party. Thus, the sensitive information has been leaked, and is available on the Internet. Accordingly, Company A's web sweep identifies and compiles candidate data leakage information.

Then, Company A performs an encryption of the each of the members of the candidate data leakage information using key A, to generate A(1111), A(2111), and sends the encrypted candidate data leakage information to Company B as A(1111), A(2111). Thus, Company B does not receive any of the values of the candidate data leakage information, but only receives the encrypted values. As a result, Company B receives an encrypted version (using key A) of the candidate credit card numbers that may include data leakages.

Accordingly, Company B (e.g., the client) retrieves the database of its corporate card numbers (e.g., 2111, 2112 and 2113), and encrypts the information in the database on key B to generate B(2111), B(2112), B(2113), using a cipher with commutative properties. Accordingly, Company B sends Company A the following result: B(2111), B(2112), B(2113). Thus, Company A does not receive the true (e.g., cleartext) identity of the credit card numbers, but only encrypted versions of the credit numbers. Additionally, Company B also encrypts, using key B, the encrypted candidate data leakage information that it had received from Company A, as B(A(1111)), B(A(2111)), and sends this result to Company A.

After receiving B(2111), B(2112), B(2113), and B(A (1111)), B(A(2111)), Company A removes its own encryption from the double-encrypted elements B(A(1111)) and B(A(2111)), to generate B(1111) and B(2111). Company A can then compare the elements that it decrypted with respect to key A (e.g., B(1111) and B(2111)) to the elements that it received from company B (e.g., B(2111), B(2112), B(2113)). Based on this comparison, Company A determines that B(1111) is not present in both sets, and B(2111) is present in both sets. In other words, the credit card number (2111) was present in Company A's search results detected during the web sweep, as well as in in the database of accounts of Company B, whereas the other credit card numbers (2112) and (2113) in Company B's database was not found in Company A's search results, and Company A's search results included (1111), which is not a credit card number associated with Company B.

After completion of the comparison and determination of the matching value, Company A provides Company B with the result, which may include a number of "hits", the encrypted values themselves (in this case, B(2111) and B(2112)), or other information, such as the URL where the candidate data leakage information was found, or related metadata. Since Company A runs the web sweep on a regular (e.g., daily) basis, historical information about past candidate data leakage information associated with the URL may also be reported to Company B. If there are no hits, this is indicative of Company B not having any potential data leakage. If there are hits, this may be indicative of Company B having a potential data leakage. If the sweep is performed on a regular basis (e.g., daily), historical data can be created that can be used by Company B to observe trends and perform data analysis.

The trend analysis may provide indirect indications of data leakage. For example, but not by way of limitation a subset of the sensitive information (e.g., some of the card numbers) may have already be leaked in the past, and new leaks may not necessarily expose all sensitive data (e.g., all of the card numbers) that leaked online. By performing trend analysis as compared with the raw number of hits, leak events detection may be improved.

For example, but not by way of limitation, a client (e.g., company) may have 1 million account numbers in its database, and only five account numbers are determined by the host to be exposed online on a daily basis as a historical average. However, on a particular day, fifteen account numbers may have been exposed online and detected by the host. Such a deviation from the historical trend may provide an indication of a potential data leakage of the sensitive information.

Alternatively, the particular account numbers that are detected by the host may be different, even if the same overall number of account numbers is detected on a given day. In the foregoing example, if the historical trend of the daily average is five account numbers being detected per day, one or more of those five account numbers may be repeated. If, on a given day, the actual numbers of the five detected account numbers are different from the historical trend of detected account number. Alternatively, there may be five account numbers detected by the host on average, and those five numbers may be repeating. However, if on one of the days, the five numbers that are detected are different from the five numbers that are repeating, such a deviation from the historical trend may provide an indication of a potential data leakage of the sensitive information.

Because Company B has the crypto key B, it can determine that the credit card numbers identified by Company A as candidate data leakage information, include (2111). However, Company A does not have, and cannot determine, the database of B's corporate card numbers, and Company B does not have any actual information associated with the encrypted results provided by Company A that do not match its corporate card numbers.

The foregoing example use case may include additional optional aspects. For example, only certain characteristics of findings (e.g., last 4 digits of credit card numbers) may be sent from Company A to Company, B to prevent the need to encrypt and transmit the entire database of card numbers. Further, random noise may be added to the findings by Company A, to prevent information leakage from Company A to Company B. Additionally, the order of elements could be adjusted so as to prevent company A from determining which finding represents a corporate card. According to another alternate example implementation, a client may employ Bloom filters, particularly if there is a substantially large amount of sensitive information in the candidate data leakage as detected by the host and passed to the client in encrypted form using the host-side key (e.g., key A).

It is noted that although it is not required for these example implementations, Company A may optionally host one or more online services for Company B, or may also more generally be a host (e.g., cloud services provider) for Company B, and may thus host services, applications and data (e.g., Company A is a cloud host for Company B). However, even in such an environment, Company A cannot access the Company B's information that is considered to be inside the "firewall" of Company B. For example, but not by way of limitation, an encryption approach may be employed to create a firewall for Company B, when Company A is hosting Company B.

FIG. 1 illustrates a system 100 according to an example implementation. More specifically, a client 101 (e.g., an enterprise, but not limited thereto) and a host 103 (e.g., a service provider, but not limited thereto) are coupled via a network such as the Internet 105. The host 103 includes a host server 107, context aware pattern matching 109, privacy preserving set intersection comparator 111, encryption/decryption engine 113, and action rules 115. The client 101 includes an agent 117, client information 119, encryption/decryption engine 121, and action rules 123. The host 103 is not within the firewall of the client 101. According to the protocol, some operations are performed by the agent 117 at the client 101, and other operations are performed by the host server 107 at the host 103. Additionally, a third party 125 that is not authorized by the client 101 may engage in unauthorized data leakage activity, such as hacking, and may obtain sensitive information of the client 101, and make the information available on the internet 105, such as by publishing and/or offering for sale.

In the system 100, publicly available information on the Internet 105, is scanned by the host server 107 of the host 103 on a regular basis (e.g., daily, but not limited thereto). For example, but not by way of limitation, the host server 107 is executing a well-known method of sweeping the web to identify information that appears to be sensitive information. For example, but not by way of limitation, the host server 107 employs context aware pattern matching 109 to perform a context-based analysis of the information on the Internet, to search for candidates of leaked information. For example, but not by way of limitation, the context aware pattern matching 109 may attempt to look for patterns (e.g., number of consecutive characters or the values of a part or all of the consecutive characters). Optionally, the host 103 may perform the analysis to find the candidate leakage information by the application of the above-noted Bloom filter.

For the candidate leaked information determined by the web sweep performed by the host server 107 using the context aware pattern matching 109, the encryption/decryption engine 113 is employed to encrypt the candidate leaked information based on a key that is at the host 103; the key at the host 103 is not provided to the client 101. The host 107 then provides the encrypted candidate leaked information to the agent 117 of the client 101.

The agent 117, upon receiving the encrypted candidate leaked information, applies the encryption/decryption engine 121 to perform a second encryption of the received, once-encrypted candidate leaked information, and also encrypts client information 119 (e.g., a database of the client information). The agent 117 has access to the client information 119, and is resident in the environment of the client 101 (e.g., cloud space of client 101, as hosted by the host 103, or another host). The encryption/decryption engine 121 uses a different key that is at the client 101 and this different key is not provided to the host 103. The agent 117 sends the twice-encrypted candidate leaked information and the encrypted client information to the host 103 via a network such as the Internet 105.

The host server 107, upon receiving the twice-encrypted candidate leaked information and the encrypted client information, performs a decryption operation, via the encryption/decryption engine 113, on the twice-encrypted candidate leaked information, to remove the encryption that it had initially applied. As a result, the encrypted candidate leaked information and the encrypted client information, both encrypted by the client 101, remains at the host 103.

The host server 107 then applies the privacy preserving set intersection comparator 111 to perform a matching operation on the values of the encrypted candidate leaked information and the encrypted client information.

If a match is determined to exist as a result of the matching operation, the host server 107 provides a report to the agent 117 of the client 101 that includes a number of matches, the encrypted matching candidate leaked information, and/or information associated with the source of the candidate data leakage (e.g., the URL and associated metadata). The agent 117 applies action rules 123 to determine an action to be taken, as explained in greater detail below. If a match is determined to not exist as a result of the matching operation, action rules 115 are applied, and the host 103 takes an action, as explained in greater detail below.

As noted above, in response to receiving the host-encrypted data communication, and by using a common encryption key, the software agent 117 may encrypt a database of enterprise information and re-encrypt the host-encrypted data communication, and provide the software agent-encrypted database of enterprise communication and the re-encrypted data communication to the host 103. The host may decrypt a host-encrypted aspect of the re-encrypted data communication to generate a software agent-encrypted data communication, and perform a matching operation to determine whether a match exists between the encrypted database of information and the software agent-encrypted data communication.

For the match determined to exist, the host 103 may provide a report to the software agent 117, and the software agent 117 may take a first action based on the report. As explained above, the report may include a number of matches, the encrypted matching candidate leaked information, and/or information associated with the source of the candidate data leakage (e.g., the URL and associated metadata).

The action by the software agent 117 may include reviewing the number of matches, and if the number of matches exceeds a threshold, determining that a data leakage event has occurred. However, the review is not limited to determining whether the number of matches exceeds a threshold, and other analytic approaches may be substituted therefor, or used in conjunction with the foregoing review.

For example, by not by way of limitation, instead of (or in addition to) comparing the number of matches to a threshold, the number of matches may be compared to a historical average of the number of hits per day over the entire history of the analysis period, or some subset thereof (e.g., previous number of days, weeks or months; average for that day of the week, month, or year; or other subset as would be understood by those skilled in the art).

Further, according to another example implementation, an analysis may be performed with respect to information other than the number of matches. For example, the number of sites (e.g., URLs), as detected by the host, that publish the same leaked sensitive information, or a change in the number of sites, as detected by the host, that publish the same leaked sensitive information, may provide information indicative of a leakage of sensitive information. Such information may be useful in investigation of the data leakage, such as by an enforcement authority and/or the client.

The software agent 117, automatically and/or based on a manual review step, may generate and provide an alert to the relevant authority (e.g., credit card-associated company, bank, law enforcement agency, license issuing agency, or other authority as would be understood by those skilled in the art). Further, an administrator of the client 101 may be alerted that a leak may have taken place. However, the example implementation is not limited thereto, and other actions in response to a data leakage as would be understood by those skilled in the art may be substituted therefor without departing from the inventive scope.

For the match determined to not exist, the host 103 may take a second action. The second action by the host 103 may include not providing a report to the software agent 117.

As noted above, the software agent at the client 101 (e.g., enterprise) is not provided with a key used by the host 103 encrypting the candidate data leakage information, and the host 103 is not provided with the common encryption key of the software agent 117.

According to an example implementation, the 103 host may partially encrypt the data communication, and leaves an unencrypted portion of the data communication as cleartext. Further, the host 103 may provide the partially encrypted data communication and the cleartext to the software agent. As a result, the processing requirements may be reduced, because the entire string of every candidate leaked information need not be encrypted, transmitted and decrypted between the host 103 and the client 101.

As noted above, the software agent 117 may add noise into the encrypted database and send the encrypted database with the noise to the host 103. Similarly, the software agent 117 may re-order values in the host-encrypted data communication during the re-encryption of the host-encrypted data communication. Taking such an approach may make it more difficult for the host 103 to obtain information about the actual content of the database, particularly if the sample size is small.

The foregoing example implementations may be directed to various entities, and for use in various environments. Examples of types of usages of the example implementations are provided below. However, these example implementations are not intended to be limiting, and other environments may be substituted therefor, as would be understood by those skilled in the art.

For example, but not by way of limitation, the foregoing example implementations may be directed to a consumer retailer that conducts online transactions (e.g., credit card purchase of retail goods and/or services by an online user). The sensitive information that is associated with the online transactions may include, but is not limited to, credit card information, bank account information, and online information associated with the user (e.g., user profile, password, demographic information, user purchase preferences, or the like).

Additionally, the example implementation may be directed to an online entity such as an identity theft agency. According to this example implementation, the identity theft agency may match data associated with their customers, to assist in detection of online account theft. The online customers of the identity theft agency may include, but are not limited to, users that have requested the identity theft agency to perform protect user-selected information (e.g., credit card number, social security number, phone number, bank account information, user equipment information such as International Mobile Equipment Identity (IMEI) number, or the like).

Further, the example implementation may be directed to internal environments of the online entity, such as an online corporate environment. For example, but not by way of limitation, an organization may employ the example implementation to search online, in a privacy-preserving manner, for internal information that may be leaked. Such information may include, but is not limited to, trade secrets, internal project names or project codes, or other confidential information.

Also, the example implementation may be directed to an online application developer. The online application developer may have a backend for the online application that interacts with users. For example, but not by way of limitation, in the context of an online game, the backend may aggregate information associated with the identity, score and performance of users, and may include statistics that online users may wish for the application developer to keep private. Online user may wish for such information, as well as information associated with purchase patterns, usage patterns and other online user information, to be kept private.

The example implementation may also include a situation where the host is performing a web sweep of the Internet and providing results and reports for more than one company. In such a situation, each company may have its own agreement with the host as to the content of the report. For example, one company may require only the number of matches, and another company may require the number of matches, as well as information on the source URL of the data leak. The host may use rules or rule bases that can be updated by the company with respect to the content of the report. Further, the company may run diagnostics on the data provided by the host to the company. For example, the host may inform the company as to the percentage of total hits that are included in the company's database, so that the company can determine the proportion of the data leakage that is associated with the company. The company may then apply filtering or perform other diagnostics on the analytical information provided by the host. The host may also provide the company with a dashboard-style interface that provides the company with a detailed visual indication of the diagnostic information, including historical data based on past web sweeps.

Figure 2:
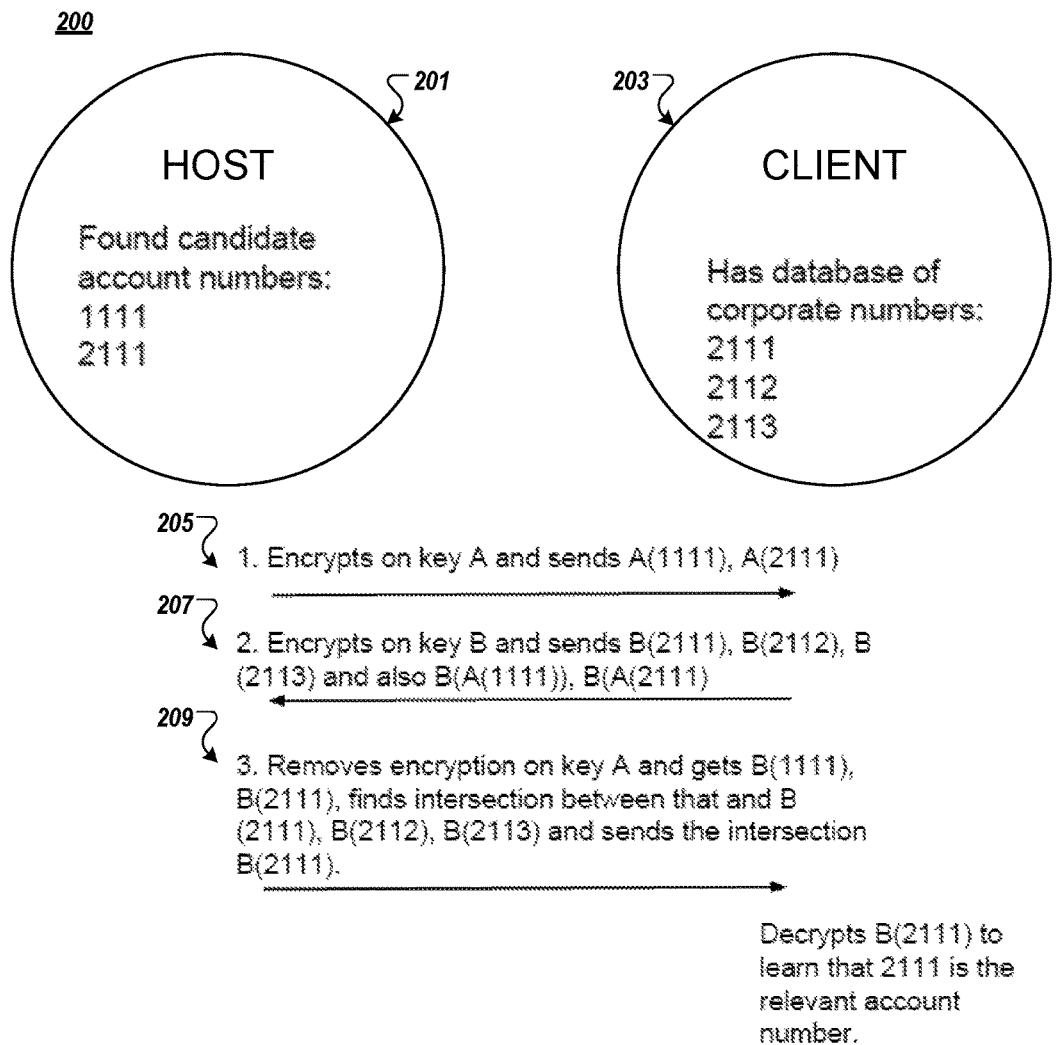
FIG. 2 shows an example for the protocol according to the example implementation.

FIG. 2 illustrates an example of a use case 200 according to the foregoing example implementation. At 201, a provider, implementing the foregoing example implementation as well as the processes described below and in FIGS. 3-6, has found candidate account numbers bearing the values "1111" and "2111", as the result of the search of the Internet (e.g., web sweep).

At 203, a client company has a database of corporate numbers that include values "2111", "2112" and "2113". The client company at 203 has not been provided the above-noted information of the provider at 201, and the provider at 201 has also not been provided the above-noted information of the client company at 203.

At 205, the provider encrypts the candidate account numbers on key A, and provides the encrypted values A(1111), A(2111) to the client company. At 207, the client company encrypts the values in its database of corporate numbers on key B, which is different from key A, and provides the encrypted values B(2111), B(2112), B(2113) to the provider. Additionally, the client company encrypts the encrypted candidate account numbers A(1111), A(2111) using key B, and provides the result B(A(1111)), B(A(2111)) to the provider.

At 209, the provider removes the encryption on key A, so as to obtain B(1111), B(2111). The provider then finds an intersection between these values B(1111), B(2111) and the encrypted corporate numbers B(2111), B(2112), B(2113). The provider sends the client company a report that may include a number of matches, the encrypted matching candidate leaked information as intersection B(2111), and/or information associated with the source of the candidate data leakage (e.g., the URL and associated metadata). The client company decrypts B(2111), and can thus determine that 2111 is the relevant account number.

Figure 3:
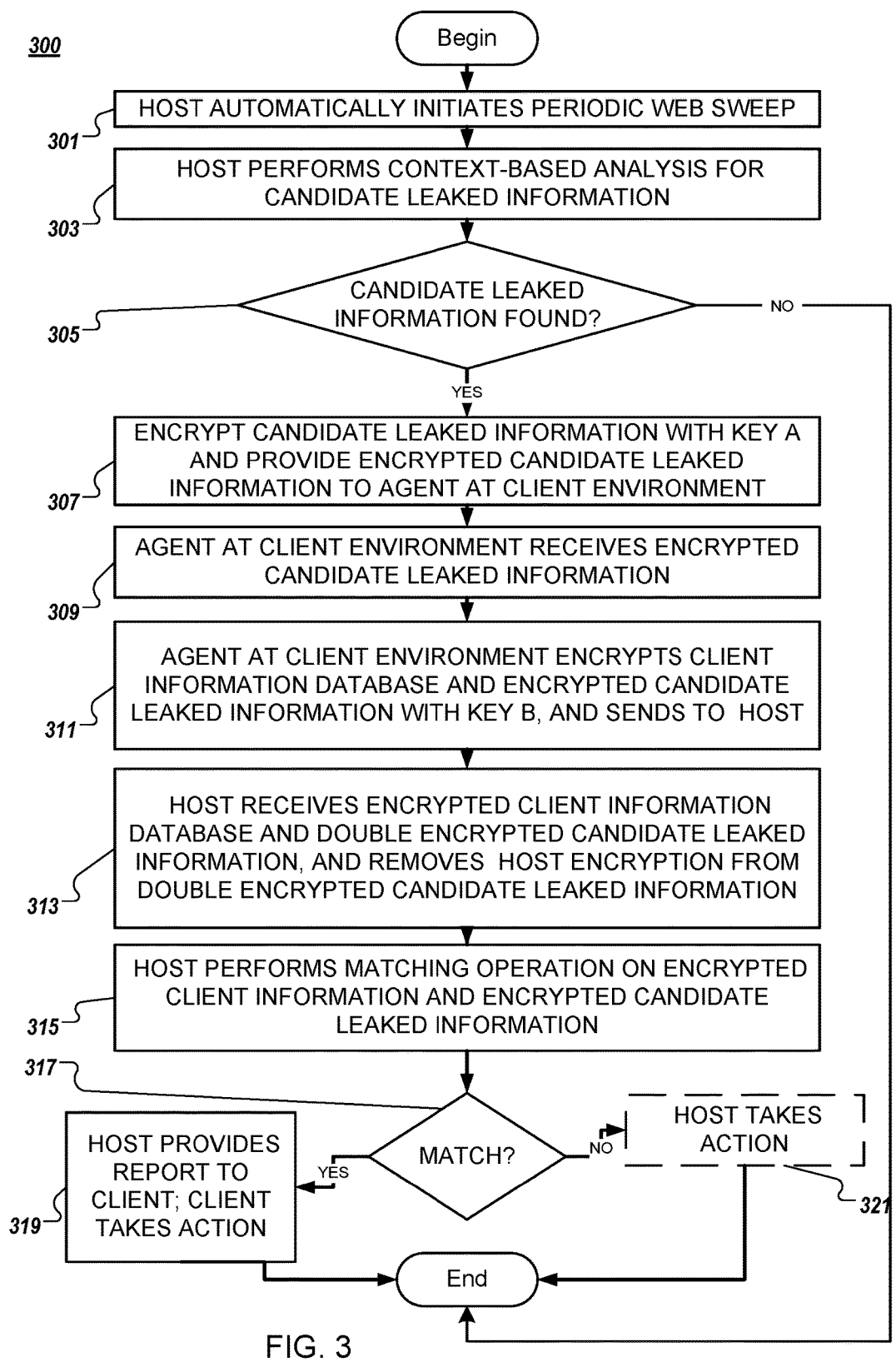
FIG. 3 shows an example process of the protocol including the client and the host according to an example implementation.

FIG. 3 illustrates a process 300 according to an example implementation of the system 100. At 301, a search of a pool of online information is performed to obtain candidates of leaked information. For example, but not by way of limitation a web sweep of the Internet may be performed to obtain this information. At 303, once received, the results of the obtaining operation of 301 are provided for a context aware pattern matching operation that is performed (e.g., a context-based analysis) on the results of the web sweep, to search for candidates of leaked information.

At 305, if no candidate leaked information is found in the outgoing data, the process is ended (e.g., the host has determined that there is no sensitive data leak on the Internet, based on the web sweep). If the web sweep result is determined to include candidate leaked information at 305, then the process proceeds to 307.

At 307, the candidate leaked information is encrypted, based on a key that is at the host and is not provided to the client, and the encrypted candidate leaked information is provided to the client. For example, at 309, an agent (e.g., a software program at the client that performs instructions for the client) may receive the encrypted candidate leaked information.

At 311, the agent uses a key to perform a second encryption of the received, once-encrypted candidate leaked information, and also encrypts client information (e.g., the database of the client information). The key that is used by the agent is not provided to the host, and thus, the host cannot decrypt the content that was encrypted by the agent. Also at 311, the agent provides the twice-encrypted candidate leaked information and the encrypted client information to the host.

At 313, the host receives the twice-encrypted candidate leaked information and the encrypted client information, performs a decryption operation so as to remove the encryption that it initially applied on the twice-encrypted candidate leaked information.

At 315, a matching operation is performed (e.g., by privacy preserving set intersection comparator) on the values of the encrypted candidate leaked information and the encrypted client information.

At 317, it is determined whether one or more match has been found. If a match is determined to exist as a result of the matching operation at 317, then at 319 the host provides a report to the agent that includes a number of matches, the encrypted matching candidate leaked information, and/or information associated with the source of the candidate data leakage (e.g., the URL and associated metadata), and the agent applies determines an action to be taken, as explained above. If a match is determined to not exist as a result of the matching operation at 317, then at 321 the host optionally takes an action, as explained above.

Figure 4:
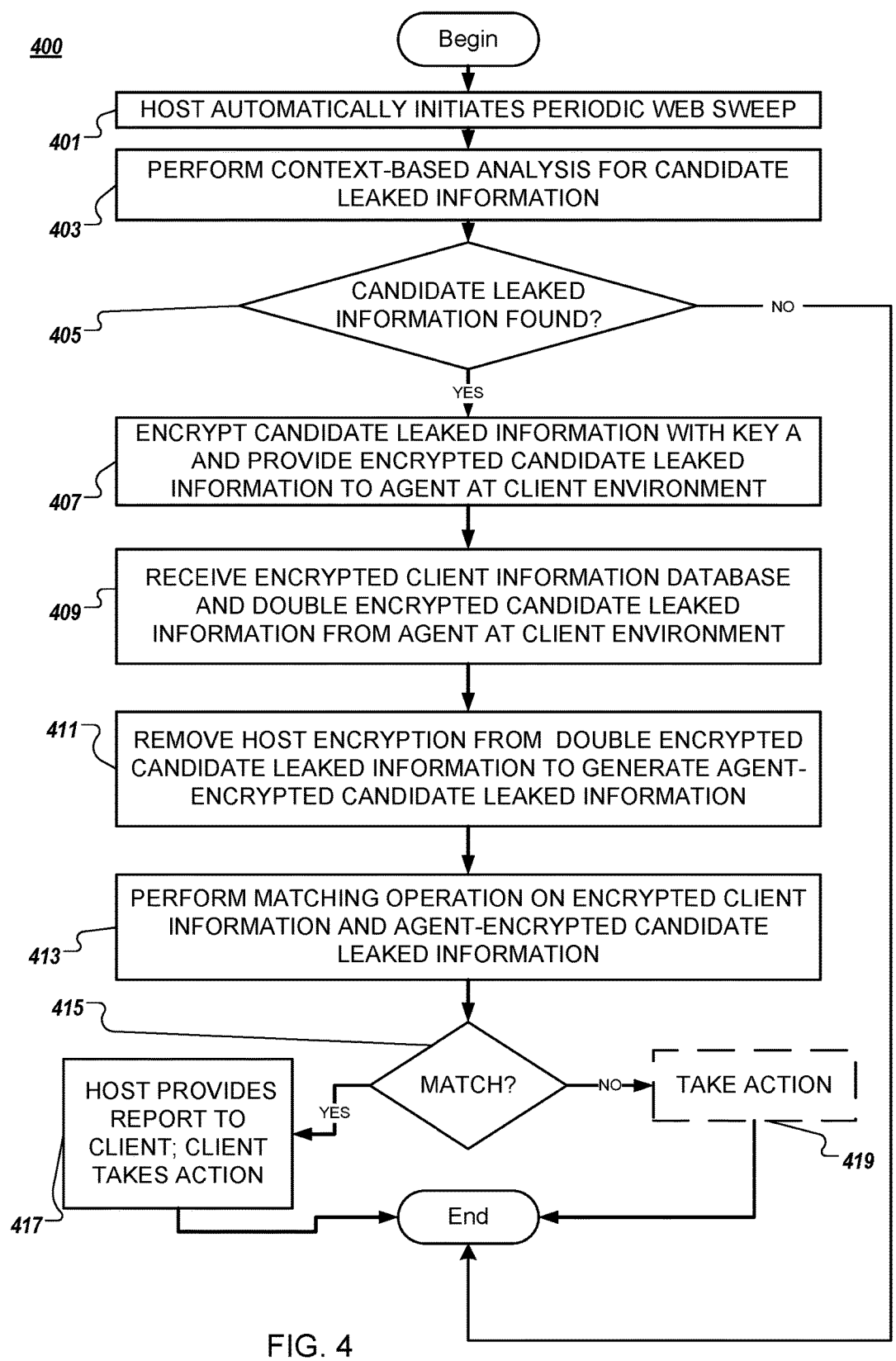
FIG. 4 shows an example process of the protocol including the host according to an example implementation.

FIG. 4 illustrates a process 400 according to an example implementation of the host 103. At 401, a search of a pool of information is performed to obtain candidates of leaked information. For example, but not by way of limitation a web sweep of the Internet may be performed to obtain this information. At 403, once received, the results of the obtaining operation of 401 are provided for a context aware pattern matching operation that is performed (e.g., a context-based analysis) on the results of the web sweep, to search for candidates of leaked information.

At 405, if no candidate leaked information is found in the outgoing data, the process is ended (e.g., the host has determined that there is no sensitive data leak on the Internet, based on the web sweep). If the outgoing data is determined to include candidate leaked information at 405, then the process proceeds to 407.

At 407, the candidate leaked information is encrypted (e.g., leak of data on the Internet), based on a key that is at the host and is not provided to the client, and the encrypted candidate leaked information is provided to the client (e.g., an agent at the client).

At 409, the host receives twice-encrypted candidate leaked information and the encrypted client information, which has been encrypted using a key that is not available to the host. For example, but not by way of limitation, an agent may use a key to perform a second encryption of the received, once-encrypted candidate leaked information, and also encrypts client information (e.g., the database of the client information). The key that is used by the agent is not provided to the host, and thus, the host cannot decrypt the content that was encrypted by the agent.

At 411, the host performs a decryption operation so as to remove the encryption that it initially applied on the twice-encrypted candidate leaked information.

At 413, a matching operation is performed (e.g., by the privacy preserving set intersection comparator) on the values of the encrypted candidate leaked information and the encrypted client information.

At 415, it is determined whether a match has been found. If a match is determined to exist as a result of the matching operation at 415, then at 417 the host provides a report to the agent that includes a number of matches, the encrypted matching candidate leaked information, and/or information associated with the source of the candidate data leakage (e.g., the URL and associated metadata), and the agent applies determines an action to be taken, as explained above. If a match is determined to not exist as a result of the matching operation at 415, then at 419 the host optionally takes an action, as explained above.

Figure 5:
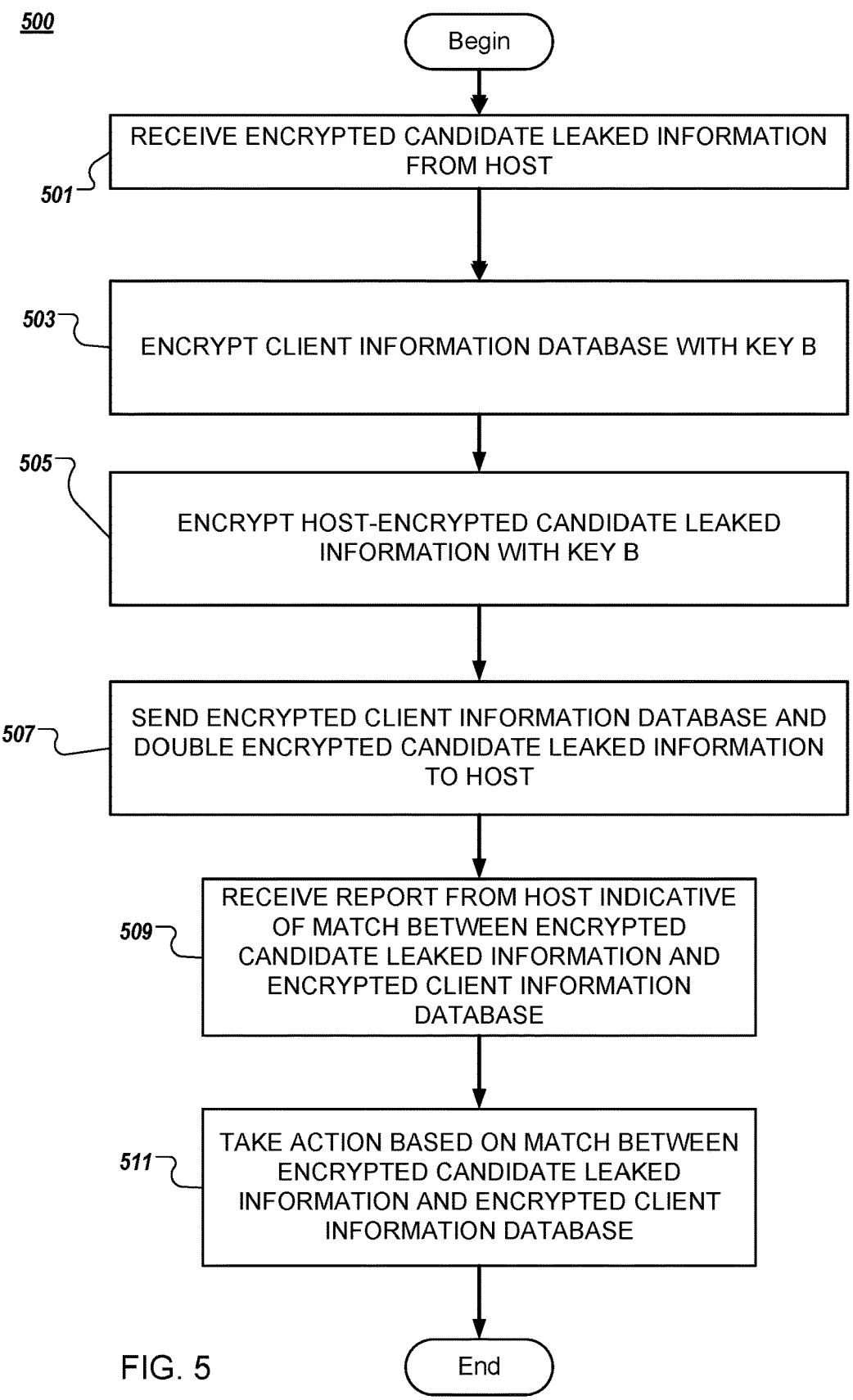
FIG. 5 shows an example process of the protocol including the client according to an example implementation.

FIG. 5 illustrates a process 500 according to an example implementation of the client 101. At 501, an agent at the client receives encrypted candidate leaked information from a host. The agent, and the client for that matter, are not able to access the key that was used to encrypt the candidate leaked information, and thus cannot determine the actual value of the candidate leaked information.

At 503, the agent uses a key to perform a second encryption of the received, once-encrypted candidate leaked information, and at 505 encrypts client information (e.g., the database of the client information). The key that is used by the agent is not provided to the host, and thus, the host cannot decrypt the content that was encrypted by the agent.

At 507, the agent provides the twice-encrypted candidate leaked information and the encrypted client information to the host.

At 509, the agent receives a report from the host that includes a number of matches, the encrypted matching candidate leaked information, and/or information associated with the source of the candidate data leakage (e.g., the URL and associated metadata), and the agent applies determines an action to be taken, as explained above.

At 511, the agent applies determines an action to be taken, as explained above.

In some examples, the foregoing processes illustrated in FIGS. 3-5 may be implemented with different, fewer, or more blocks. Processes 300, 400, and/or 500 may be implemented as computer executable instructions, which can be stored on a medium, loaded onto one or more processors of one or more computing devices, and executed as a computer-implemented method.

Figure 6:
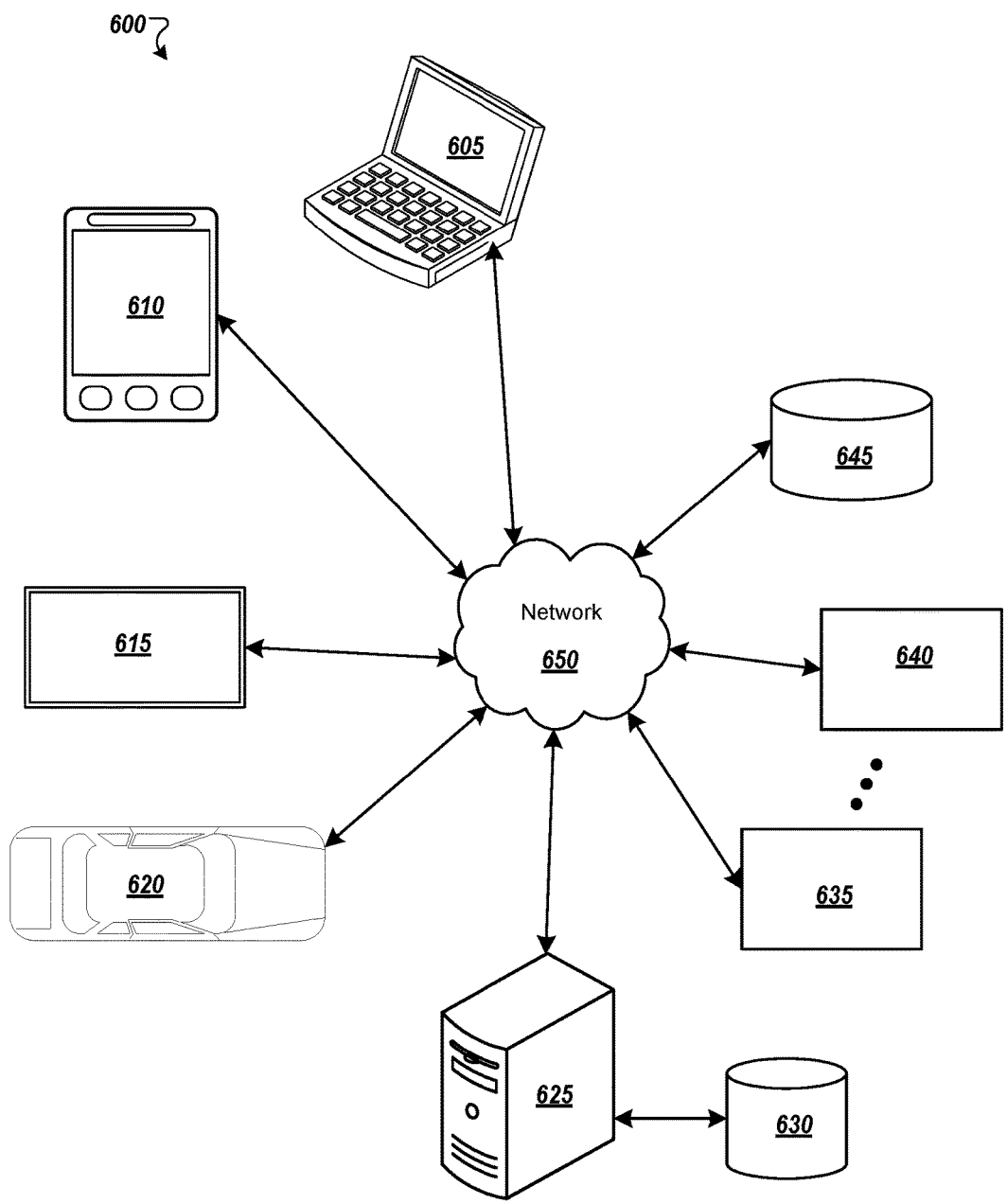
FIG. 6 shows an example environment suitable for some example implementations.

FIG. 6 shows an example environment suitable for some example implementations. Environment 600 includes devices 605-645, and each is communicatively connected to at least one other device via, for example, network 660 (e.g., by wired and/or wireless connections). Some devices may be communicatively connected to one or more storage devices 630 and 645.

An example of one or more devices 605-645 may be computing devices 705 and/or 805 described below in FIGS. 7 and 8, respectively. Devices 605-645 may include, but are not limited to, a computer 605 (e.g., a laptop computing device), a mobile device 610 (e.g., smartphone or tablet), a television 615, a device associated with a vehicle 620, a server computer 625, computing devices 635-640, storage devices 630 and 645.

In some implementations, devices 605-620 may be considered user devices associated with the users of the enterprise (e.g., devices used by users to access services and/or issue requests, such as on a social network, or to access their personal online information while within the firewall of the enterprise). Devices 625-645 may be devices associated with service providers (e.g., used by the external host to provide services as described above and with respect to FIGS. 3-5, and/or store data, such as webpages, text, text portions, images, image portions, audios, audio segments, videos, video segments, and/or information thereabout).

For example, by not by way of limitation, a user (e.g., Alice) who is not authorized by an enterprise having user device 605 or 610 on a network supported by one or more devices 625-645, may have accessed, viewed, and/or shared sensitive information in an unauthorized manner, and made such information available on the Internet, using user device 605 or 610 if Alice is leaking the data from inside the enterprise, or another user device 615. A recipient that is the host (e.g., Bob) may access and/or view Alice's shared sensitive information (e.g., candidate leaked information) using device 620, in accordance with the process described above with respect to FIGS. 3-5.

Figure 7:
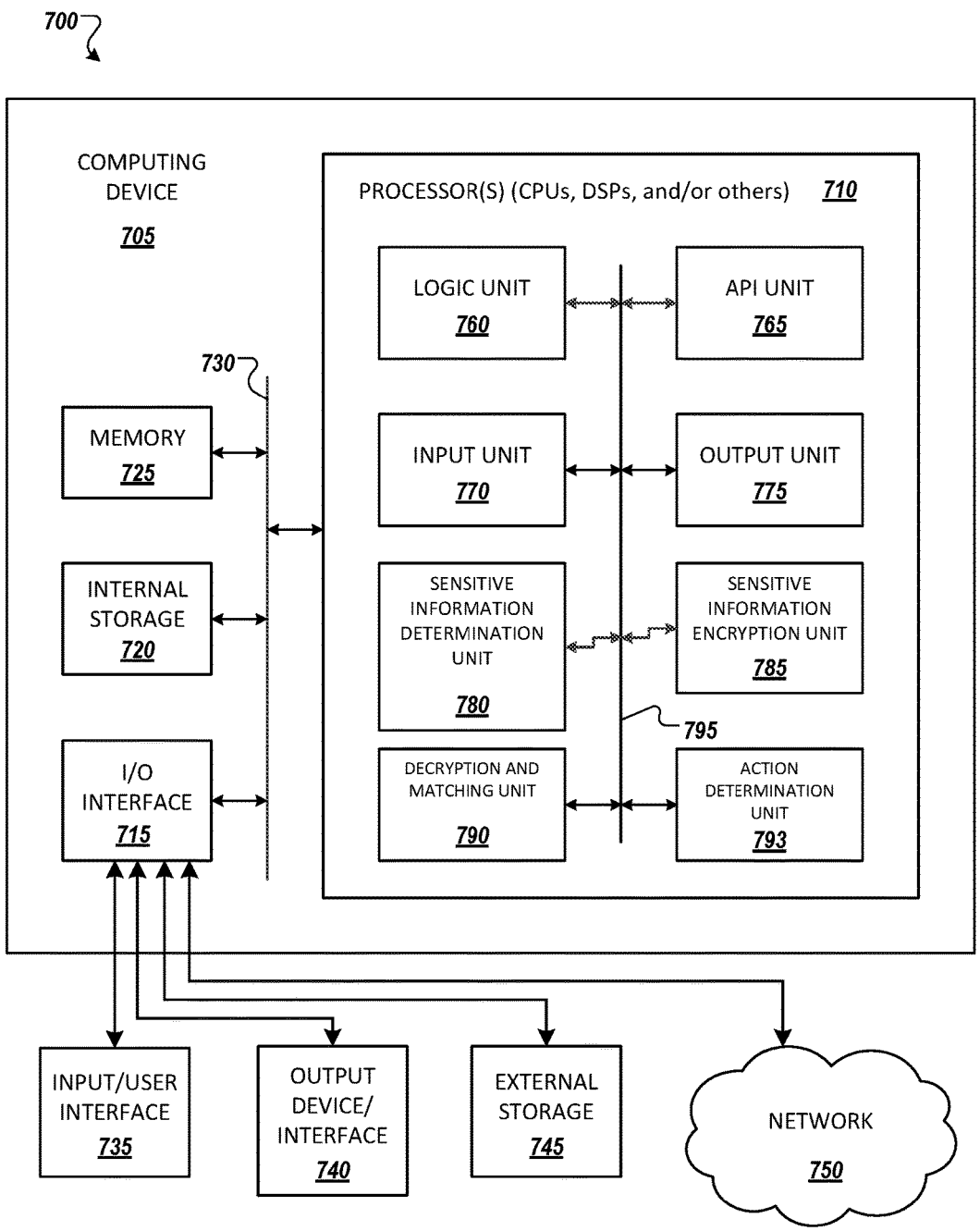
FIG. 7 shows an example computing environment with an example computing device associated with the external host for use in some example implementations.

FIG. 7 shows an example computing environment with an example computing device associated with the external host for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705.

Computing device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computing device 705. In other example implementations, other computing devices may function as or provide the functions of input/user interface 735 and output device/interface 740 for a computing device 705.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as a server, client, thin server, general machine, special-purpose machine, or another label.

The I/O interface 725 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, sensitive information determination unit 780, sensitive information encryption unit 785, decryption and matching unit 790, action determination unit 793, and inter-unit communication mechanism 795 for the different units to communicate with each other, with the OS, and with other applications (not shown). For example, sensitive information determination unit 780, sensitive information encryption unit 785, decryption and matching unit 790 and action determination unit 793 may implement one or more processes shown in FIGS. 3 and 4. The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775, sensitive information determination unit 780, sensitive information encryption unit 785, decryption and matching unit 790, and action determination unit 793).

For example, after input unit 770 has received the data associated with the web sweep that searches the Internet for candidate leaked information, input unit 770 may use API unit 765 to communicate the content of the web sweep to sensitive information determination unit 780. For example, sensitive information determination unit 780 may, by use of context-based analysis, make a determination that the web sweep information includes candidate leaked information.

Sensitive information determination unit 780 may, via API unit 765, interact with the sensitive information encryption unit 785 to encrypt the candidate leaked information. Using API unit 765, sensitive information determination unit 780 may interact with decryption and matching unit 790 to receive and decrypt the twice encrypted candidate leaked information (e.g., from the client), so that encryption applied by the sensitive information encryption unit 785 is removed, and then perform a matching operation between the encrypted candidate leaked information and encrypted client database information, to determine the presence of a match, and provide information to the agent that includes a number of matches, the encrypted matching candidate leaked information, and/or information associated with the source of the candidate data leakage (e.g., the URL and associated metadata). Action determination unit 793 may determine an action to be taken when it is determined that a match is not present by the decryption and matching unit 790.

In some instances, logic unit 760 may be configured to control the information flow among the units and direct the services provided by API unit 765, input unit 770, output unit 775, sensitive information determination unit 780, sensitive information encryption unit 785, decryption and matching unit 790 and action determination unit 793 in some example implementations described above. For example, the flow of one or more processes or implementations may be controlled by logic unit 760 alone or in conjunction with API unit 765.

Figure 8:
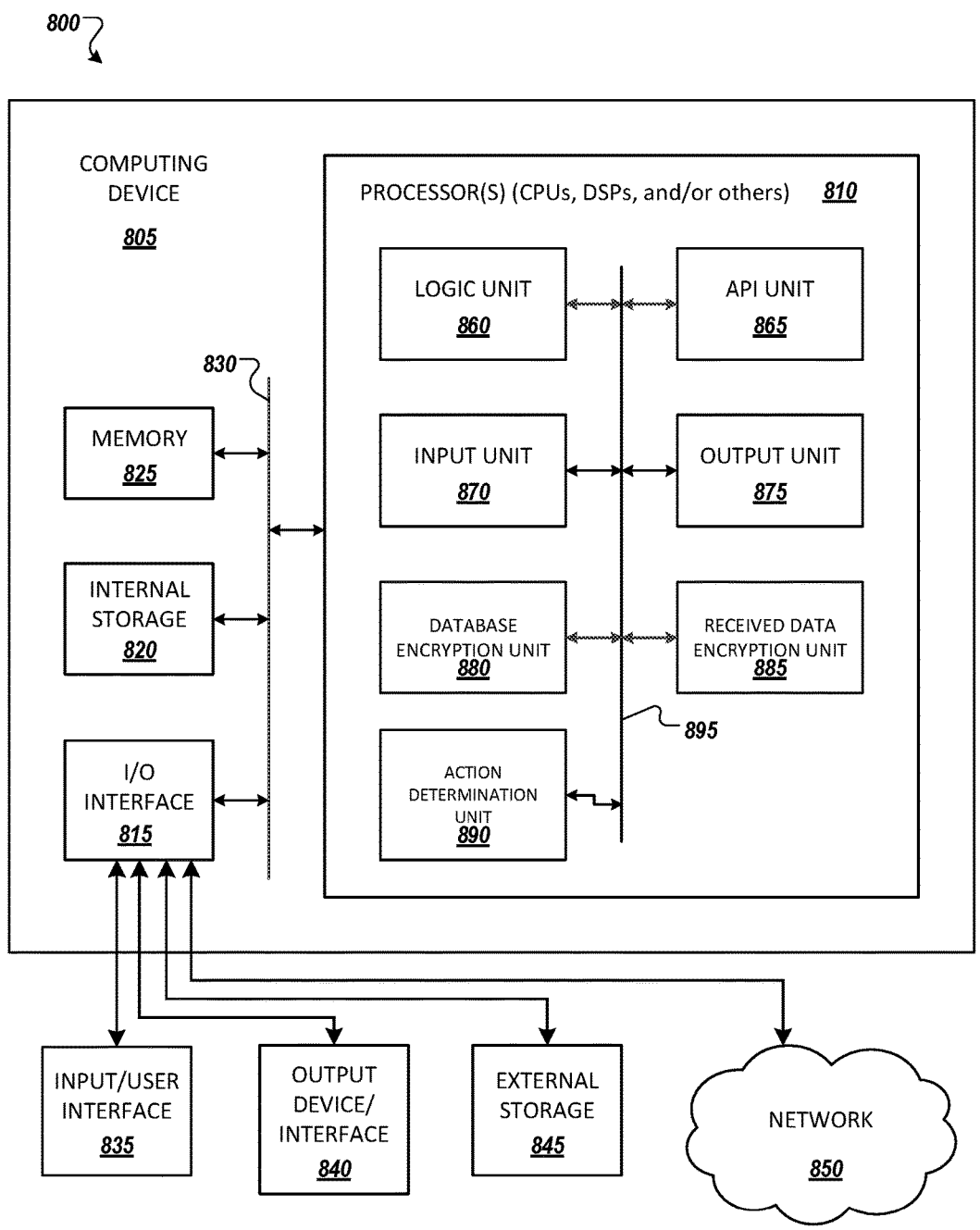
FIG. 8 shows an example computing environment with an example computing device associated with the client for use in some example implementations.

FIG. 8 shows an example computing environment with an example computing device associated with the enterprise for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computing device 805. In other example implementations, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

The I/O interface 825 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, database encryption unit 880, received data encryption unit 885, action determination unit 890, and inter-unit communication mechanism 895 for the different units to communicate with each other, with the OS, and with other applications (not shown). For example, database encryption unit 880, received data encryption unit 885, and action determination unit 890 may implement one or more processes shown in FIGS. 3 and 5. The described units and elements can be varied in design, function, configuration, or implementation and are not limited to the descriptions provided.

In some example implementations, when information or an execution instruction is received by API unit 865, it may be communicated to one or more other units (e.g., logic unit

860, input unit 870, output unit 875, database encryption unit 880, received data encryption unit 885, and action determination unit 890).

For example, after input unit 870 has received an encrypted candidate leaked information from the host, input unit 870 may use API unit 865 to communicate this information to the database encryption unit 880, which encrypts the client information database. Database encryption unit 880 may, via API unit 865, interact with the received data encryption unit 885 to encrypt the encrypted candidate leaked information received from the host. Using API unit 865, action determination unit 890 may determine an action to be taken based on information received from the host that may include a report that includes a number of matches, the encrypted matching candidate leaked information, and/or information associated with the source of the candidate data leakage (e.g., the URL and associated metadata).

In some instances, logic unit 860 may be configured to control the information flow among the units and direct the services provided by API unit 865, input unit 870, output unit 875, database encryption unit 880, received data encryption unit 885, and action determination unit 890 in some example implementations described above. For example, the flow of one or more processes or implementations may be controlled by logic unit 860 alone or in conjunction with API unit 865.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The example implementations may have various benefits and advantages. For example, but not by way of limitation, privacy may be preserved for the member of the client (e.g., individual users), and privacy may also be preserved for the client and the host. Thus, data leakage determination can be provided without requiring reliance on a trusted external party (e.g., third party to process and be made aware of the actual content or cleartext of the outgoing data). As a result, privacy of the sensitive information is preserved. The example implementations may also be incorporated in a cloud-based environment, where cloud components implementing the client side of the protocol may be deployed in a uniform, scalable manner.

The example implementations may have further benefits and advantages. For example, but not by way of limitation, the example implementations may overcome the related problems and/or disadvantages associated with the host not being able to maintain the privacy of the sensitive information by maintaining the privacy of the client information as well as the privacy of the online candidate information. Further, the example implementation may overcome the related art time lag problem by use of a web crawler to reveal another party associated with the data leak (e.g., online hackers that are attempting to sell the sensitive information that was obtained without authorization).

Accordingly, the candidate sensitive information resulting from the online search by the host is correlated with encrypted sensitive information provided by the client, but the sensitive information itself is not provided to the host. Similarly, results of the determination (e.g., candidate data leak information) host are provided to the client as encrypted candidate sensitive information (e.g., leaked sensitive information of the client); however, the candidate sensitive information itself is not provided to the host. This is accomplished by the use of the secure set intersection, as explained above.

In situations in which the systems discussed here collect personal information about users, or may make use of personal information, the users (e.g., user at the enterprise having both work and non-work accounts integrated together) may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method of detecting data leakage, the method comprising:
   receiving, at data processing hardware of an enterprise from a host external to a firewall of the enterprise, a host-encrypted data communication from an online source associated with a candidate data leakage;
   using a common encryption key, encrypting, by the data processing hardware, a database of enterprise information and re-encrypting the host-encrypted data communication;
   providing, by the data processing hardware, the encrypted database of enterprise information and the re-encrypted data communication to the host;
   receiving, at the data processing hardware, an indication from the host of a match existing between the encrypted database of enterprise information and the re-encrypted data communication; and
   in response to receiving the indication from the host of the match existing between the encrypted database of enterprise information and the re-encrypted data communication, taking, by the data processing hardware, an action.

2. The computer-implemented method of claim 1, wherein a key used to generate the host-encrypted data communication originating from the online source is not received by the enterprise, and the enterprise does not provide the common encryption key to the host.

3. The computer-implemented method of claim 1, further comprising:
   introducing, by the data processing hardware, noise into the encrypted database; and
   providing, by the data processing hardware, the encrypted database with the introduced noise to the host.

4. The computer-implemented method of claim 1, further comprising re-ordering, by the data processing hardware, values in the host-encrypted data communication during the re-encryption of the host-encrypted data communication.

5. The computer-implemented method of claim 1, wherein taking the action comprises providing an alert to an external entity to indicate that the data leakage is associated with the enterprise.

6. The computer-implemented method of claim 5, wherein a software agent at the enterprise provides the alert to the external entity.

7. The computer-implemented method of claim 1, wherein the host-encrypted data communication received by the enterprise includes an unencrypted portion of the data communication as cleartext, and a partially encrypted data communication.

8. The computer-implemented method of claim 1, wherein receiving the indication from the host comprises receiving at least one of a number of matches, encrypted matching candidate leaked information, and information associated with the online source of the candidate data leakage.

9. The computer-implemented method of claim 8, wherein the information associated with the online source of the candidate data leakage comprises at least one of a Uniform Resource Locator (URL) identified during a web sweep of online information as the source of the candidate data leakage, and metadata associated with the URL.

10. The computer-implemented method of claim 9, wherein the web sweep of the online information is a web sweep of the Internet, and the web sweep of the Internet is performed at a prescribed period.

11. The computer-implemented method of claim 1, wherein the indication of the match is determined by applying a set intersection algorithm.

12. A system for detecting data leakage from an enterprise having a firewall, the system comprising:
   data processing hardware of an enterprise; and
   memory hardware in communication with the data processing hardware, the memory hardware storing instructions that when executed on the data processing hardware cause the data processing hardware to perform operations comprising:
      receiving, from a host external to the firewall of the enterprise, a host-encrypted data communication from an online source associated with a candidate data leakage;
      using a common encryption key, encrypting a database of enterprise information and re-encrypting the host-encrypted data communication;
      providing the encrypted database of enterprise information and the re-encrypted data communication to the host;
      receiving an indication from the host of a match existing between the encrypted database of enterprise information and the re-encrypted data communication; and
      in response to receiving the indication from the host of the match existing between the encrypted database of enterprise information and the re-encrypted data communication, taking an action.

13. The system of claim 12, wherein a key used to generate the host-encrypted data communication originating from the online source is not received by the enterprise, and the enterprise does not provide the common encryption key to the host.

14. The system of claim 12, wherein the operations further comprise a software agent at the enterprise introducing noise into the encrypted database and providing the encrypted database with the introduced noise to the host.

15. The system of claim 12, wherein the operations further comprise a software agent at the enterprise re-ordering values in the host-encrypted data communication during the re-encryption of the host-encrypted data communication.

16. The system of claim 12, wherein taking the action comprises providing an alert to an external entity to indicate that the data leakage is associated with the enterprise.

17. The system of claim 12, wherein the host-encrypted data communication received by the enterprise includes an unencrypted portion of the data communication as clear text, and a partially encrypted data communication.

18. The system of claim 12, wherein receiving the indication from the host comprises at least one of receiving a number of matches, encrypted matching candidate leaked information, and information associated with the online source of the candidate data leakage.

19. The system of claim 18, wherein the information associated with the online source of the candidate data leakage comprises at least one of a Uniform Resource Locator (URL) identified during a web sweep of online information as the source of the candidate data leakage, and metadata associated with the URL.

20. The system of claim 19, wherein the web sweep of the online information is a web sweep of the Internet, and the web sweep of the Internet is performed at a prescribed period.

* * * * *